United States Patent
Grammel et al.

(10) Patent No.: US 10,277,353 B1
(45) Date of Patent: Apr. 30, 2019

(54) WAVELENGTH PROVISIONING FOR CUSTOMER PREMISE EQUIPMENT (CPE) IN DENSE WAVELENGTH-DIVISION MULTIPLEX (DWDM) NETWORKS

(71) Applicant: Juniper Networks, Inc., Sunnyvale, CA (US)

(72) Inventors: Gert Grammel, Ditzingen (DE); Kevan Peter Jones, Kanata (CA)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/847,385

(22) Filed: Dec. 19, 2017

(51) Int. Cl.
*H04J 14/02* (2006.01)
*H04L 12/24* (2006.01)
*H04L 12/12* (2006.01)

(52) U.S. Cl.
CPC ........ *H04J 14/023* (2013.01); *H04J 14/0221* (2013.01); *H04L 41/12* (2013.01); *H04J 14/0282* (2013.01); *H04L 12/12* (2013.01)

(58) Field of Classification Search
CPC .. H04J 14/023; H04J 14/0221; H04J 14/0282; H04L 41/12; H04L 12/12
USPC .......................................................... 398/71
See application file for complete search history.

(56) References Cited

U.S. PATENT DOCUMENTS

| | | | | |
|---|---|---|---|---|
| 7,583,669 B2 * | 9/2009 | Yoo | ..................... | H04J 14/0226 370/390 |
| 7,778,544 B2 | 8/2010 | Hinderthür | | |
| 2005/0123300 A1 * | 6/2005 | Kim | ..................... | H04J 14/0226 398/84 |
| 2009/0154930 A1 | 6/2009 | Hinderthuer | | |
| 2009/0169206 A1 | 7/2009 | Friedrich | | |
| 2009/0317073 A1 * | 12/2009 | Hotchkiss | ............. | H04J 3/1652 398/1 |
| 2012/0328239 A1 | 12/2012 | Fuerst et al. | | |
| 2013/0108263 A1 * | 5/2013 | Srinivas | ............... | H04Q 3/0083 398/45 |
| 2017/0302380 A1 * | 10/2017 | Liu | ........................ | H04B 10/66 |
| 2018/0139006 A1 * | 5/2018 | Zhao | .................... | H04J 14/0249 |

OTHER PUBLICATIONS

Banerjee, A. et al., "Wavelength-division-multiplexed passive optical network (WDM-PON) technologies for broadband access: a review [Invited]," Journal of Optical Networking, vol. 4, No. 11, Nov. 2005, pp. 737-758.
Juniper Networks, Inc., "ACX Series Universal Access Routers," Data Sheet, Feb. 2017, 12 pages.
Juniper Networks, Inc., "MX Series 3D Universal Edge Routers," Data Sheet, Sep. 2017, 14 pages.

* cited by examiner

*Primary Examiner* — Dalzid E Singh
(74) *Attorney, Agent, or Firm* — Cooley LLP

(57) ABSTRACT

A system includes a first communication device and a second communication device in communication with the first communication device via an Ethernet connection. The first communication device is configured to transmit, via the Ethernet connection toward the second communication device, an Ethernet signal including information of a designated wavelength from a dense wavelength division multiplexing (DWDM) scheme to be used by the second communication device. The second communication device is configured to transmit an optical signal at the designated wavelength to the first communication device in response to receiving the Ethernet signal.

8 Claims, 7 Drawing Sheets

WAVELENGTH PROVISIONING FOR CUSTOMER PREMISE EQUIPMENT (CPE) IN DENSE WAVELENGTH-DIVISION MULTIPLEX (DWDM) NETWORKS

FIELD

One or more embodiments relate to apparatus and methods of wavelength provisioning of customer premise equipment (CPE).

BACKGROUND

A passive optical network (PON) is a point-to-multipoint optical network, where an optical line terminal (OLT) at the central office (CO) is connected to multiple optical network units (ONUs) at remote nodes through one or multiple arrayed waveguide gratings (AWGs). The ONUs can be, for example, associated with network subscribers and can include one or more customer premise equipment (CPE). The connection between the OLT and the ONU is usually passive (i.e. without any power supply).

A PON can employ wavelength division multiplexing (WDM) to form a WDM-PON. FIG. 1 shows a schematic of a WDM-PON 100, which includes a CO 110 and multiple CPEs 120(1) to 120(6) (collectively referred to as CPEs 120). The CO 110 includes a small form factor pluggable (SFP) transceiver 112 to emit optical signals at different wavelengths and an arrayed waveguide grating (AWG) 114 to multiplex these optical signals into a single optical line 115 (e.g., a fiber). An optional amplifier 116 can be used to amplify the multiplexed signal. At the other end of the optical line 115 is a second AWG 130, which directs different optical signals to different CPEs 120(1) to 120(6). Each optical connection between a CPE 120($i$) and the CO 110 is at a distinct wavelength, where i=1, 2 . . . 6.

One challenge in a WDM-PON is channel provisioning. Typically the wavelength used by the remote end is provisioned at either end in a consistent manner. Cases exist, however, where the remote ends are not easily accessible for provisioning. For example, in access networks, the remote ends include CPEs (e.g., CPEs 120) located in the customers' premises and become the Internet access once properly installed. Before installation, access to the Internet to provision the CPE is not guaranteed. In addition, the dynamic circuit network (DCN) used to configure the CPE may be down or overloaded, so the CPE cannot be reached. In some cases, on-site maintenance personnel may not be sufficiently skilled to provision the CPE correctly.

SUMMARY

Some embodiments described herein relate generally to wavelength provisioning of customer premise equipment (CPE), and, in particular, to methods and apparatus to determine the designated wavelength to be used by a CPE via an Ethernet signal sent to the CPE and encoded with the wavelength information. In some embodiments, a system includes a first communication device and a second communication device in communication with the first communication device via an Ethernet connection. The first communication device is configured to transmit, via the Ethernet connection toward the second communication device, an Ethernet signal including information of a designated wavelength from a dense wavelength division multiplexing (DWDM) scheme to be used by the second communication device. The second communication device is configured to transmit an optical signal at the designated wavelength to the first communication device in response to receiving the Ethernet signal.

In some embodiments, a method includes receiving an Ethernet signal, generated by a first communication device in communication with a second communication device via an Ethernet connection, at the second communication device while maintaining a transmitter in the second communication device in an OFF state. The Ethernet signal includes information of a designated wavelength, from a dense wavelength division multiplexing (DWDM) scheme, to be used by the second communication device. The method also includes transmitting, using the transmitter in the second communication device, an optical signal at the designated wavelength from the second communication device to the first communication device in response to receiving the Ethernet signal.

In some embodiments, a system includes an edge router disposed at a point of presence (POP) location and a group of customer routers in communication with the edge router via an Ethernet connection. Each customer router in the group of customer routers is disposed at a corresponding customer premise. The edge router is configured to transmit, via the Ethernet connection and toward a first customer router in the group of customer routers, a first LLDP signal including information of a first designated wavelength from a dense wavelength division multiplexing (DWDM) scheme to be used by the first customer router. The first customer router is configured to transmit a first optical signal to the edge router at the first designated wavelength in response to receiving the first LLDP signal. The edge router is also configured to transmit, via the Ethernet connection and toward a second customer router in the group of customer routers, a second LLDP signal including information of a second designated wavelength from the DWDM scheme, different from the first designated wavelength from the DWDM scheme, to be used by the second customer router. The second router is configured to transmit a second optical signal to the edge router at the second designated wavelength in response to receiving the second LLDP signal.

BRIEF DESCRIPTION OF THE DRAWINGS

The drawings primarily are for illustration purposes and are not intended to limit the scope of the subject matter described herein. The drawings are not necessarily to scale; in some instances, various aspects of the disclosed subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

In some embodiments, a system includes a first communication device and a second communication device in communication with the first communication device via an Ethernet connection. The first communication device is configured to transmit, via the Ethernet connection toward the second communication device, an Ethernet signal including information of a designated wavelength from a dense wavelength division multiplexing (DWDM) scheme to be used by the second communication device. The second communication device is configured to transmit an optical signal at the designated wavelength to the first communication device in response to receiving the Ethernet signal.

In some embodiments, the first communication device is disposed at a point of presence (POP) location and the second communication device includes a customer premise equipment (CPE). In some embodiments, the first communication device includes a router. In some embodiments, the first communication device includes an edge router. In some embodiments, the second communication device includes a small form-factor pluggable (SFP).

In some embodiments, the first communication device includes a first router, the second communication device includes a second router, and the Ethernet signal includes a link layer discovery protocol (LLDP) signal.

In some embodiments, the first communication device is further configured to establish a bi-directional optical link with the second communication device in response to receiving the optical signal from the second communication device.

In some embodiments, the system also includes a third communication device in communication with the first communication device via an Ethernet connection. The first communication device is configured to transmit, toward the third communication device, a second Ethernet signal including information of a second designated wavelength from the DWDM scheme to be used by the third communication device. The third communication device is configured to transmit a second optical signal at the second designated wavelength to the first communication device in response to receiving the second Ethernet signal.

In some embodiments, the first communication device includes a detector to detect the received power of the optical signal received by the first communication device. The system further includes a controller, operatively coupled to the first communication device and the second communication device, to adjust a transmitted power of the optical signal based on the received power at the first communication device.

Figure 1:
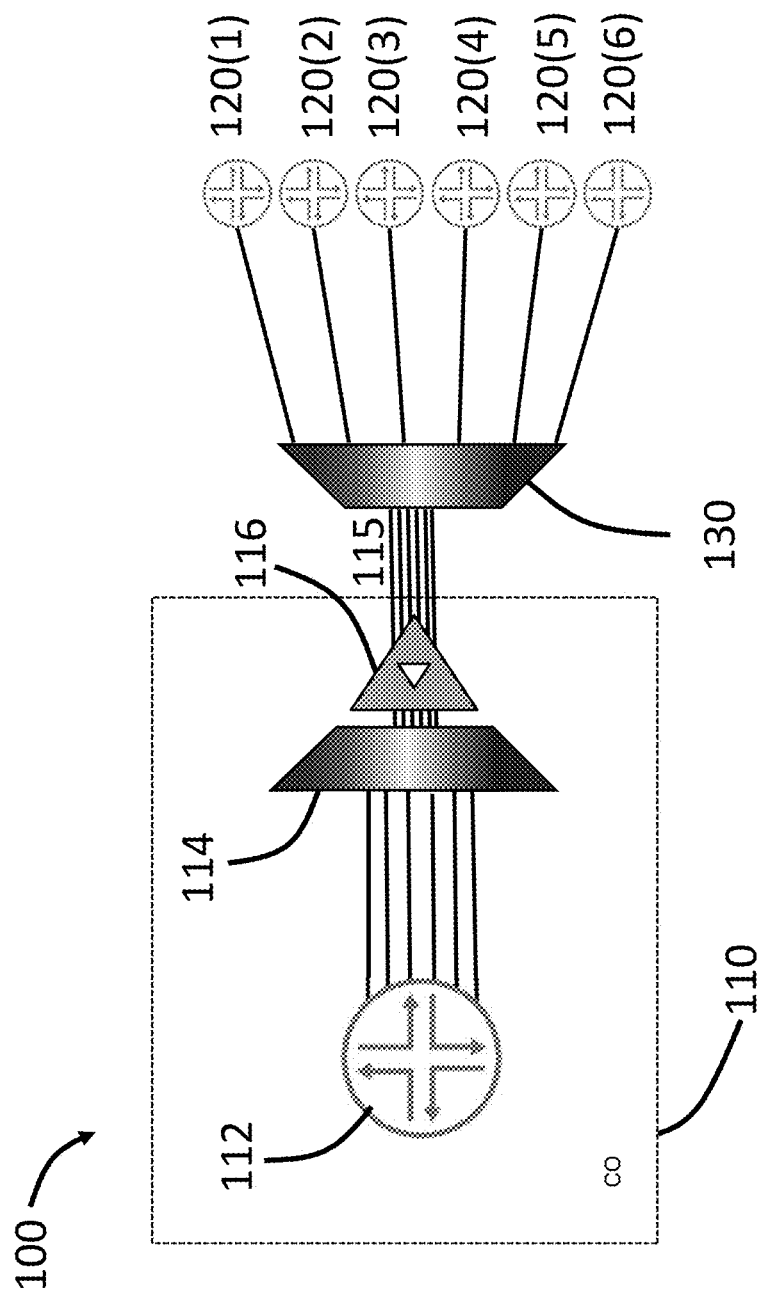
FIG. 1 shows a schematic of a wavelength division multiplexing passive optical network (WDM-PON).
Figure 2:
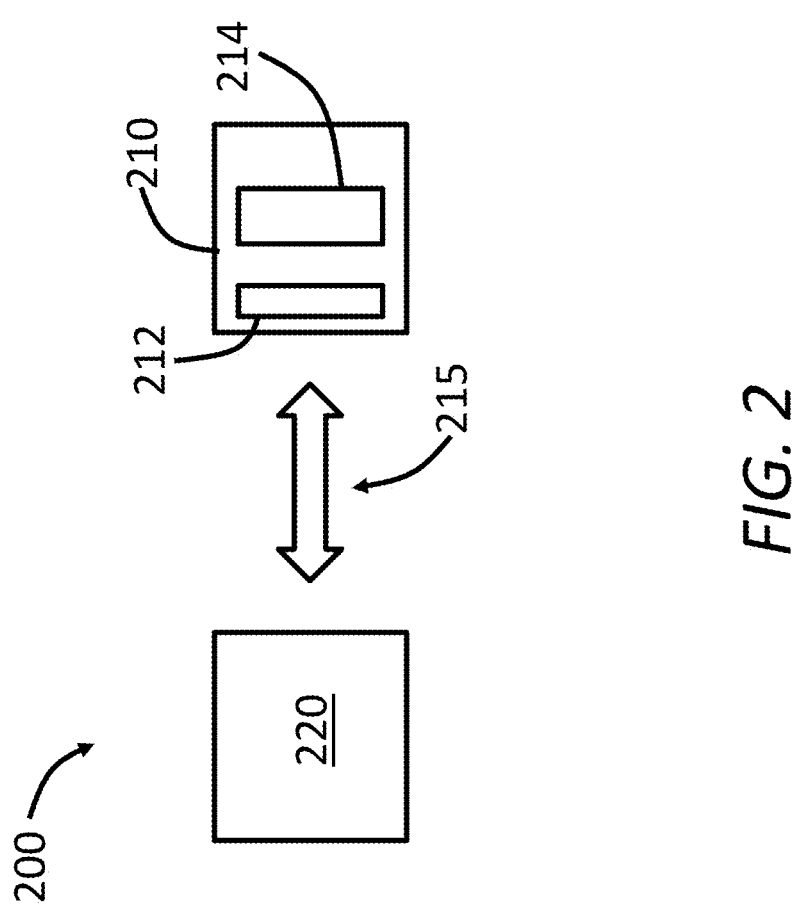
FIG. 2 shows a schematic of a system having automatic wavelength provisioning capability, according to embodiments.

FIG. 2 shows a schematic of a system 200 system having automatic wavelength provisioning capability, according to embodiments. The system 200 includes a first communication device 210 and a second communication device 220 in communication with the first communication device 210 via an Ethernet connection 215. The first communication device 210 is configured to transmit, via the Ethernet connection 215, an Ethernet signal including information of the designated wavelength to be used by the second communication device 220. Upon receiving the Ethernet signal, the second communication device 220 is configured to transmit an optical signal at the designated wavelength to the first communication device 210. Accordingly, the system 200 can remotely determine the wavelength used by the second communication device 220 without, for example, sending personnel to the second communication device 220 as used in conventional approaches.

In some embodiments, the system 200 is part of an optical network using wavelength division multiplexing (WDM) scheme, including dense wavelength multiplexing (DWDM) scheme, and the wavelength used by the second communication device is one wavelength in the WDM or DWDM scheme. In some embodiments, the system 200 is part of a WDM-PON.

In some embodiments, the first communication device 210 is located at a point of presence (POP) location and the second communication device 220 includes a CPE located at a customer premise. In some embodiments, the first communication device 210 includes a router. In some embodiments, the first communication device 210 includes an edge router, and the system 200 can be part of an access network.

In some embodiments, the first communication device 210 includes a first router and the second communication device 220 includes a second router. The Ethernet signal can be a link-layer discovery protocol (LLDP) signal, which can use, for example, TLV-type 7 to encode the wavelength information. In one example, the wavelength information can be encoded as a 32-bit integer. In another example, the wavelength information can be encoded as a floating point with at least 3-digit precision (e.g., when expressed in nanometers). In some embodiments, the Ethernet signal can include an Y.1731 signal, which usually allows using Ethernet vendor-specific operation, administration, and maintenance (OAM) information. In some embodiments, the Ethernet signal can include an address resolution protocol (ARP) signal and the wavelength information can be delivered in the payload of a ping packet.

In some embodiments, the system 200 can automatically establish a bi-directional link between the first communication device 210 and the second communication device 220. In these embodiments, the first communication device 210 (e.g., located at a head-end of an optical network) switches on its transmitter (not shown in FIG. 2) to transmit the Ethernet signal including information of the wavelength to be used by the second communication device 220 (e.g., a CPE). On the other end of the network, the second communication device 220 listens passively to the information from the first communication device 210 (i.e., keep its transmitter in the OFF state) and decodes the wavelength information after receiving the Ethernet signal. Based on the decoded information, the second communication device 220 turns on its transmitter and emits (or transmits) the optical signal at the designated wavelength toward the first communication device 210. The optical signal can include one or more Ethernet frames. Upon receiving the Ethernet frames from the second communication device 220, information is exchanged between the first communication device 210 and the second communication device 220, i.e., a bi-directional link is established.

In some embodiments, this automatic establishment of the bi-directional link can be implemented by a controller 214 included in the system. In some embodiments, the controller 214 is integrated into the first communication device 210. In some embodiments, the controller includes (or is located at) an external device separate from the first communication device 210. The system 200 can further include memory to store processor-executable instructions and upon execution by a processor of the controller 214 of the processor-executable instructions, the controller 214 controls the first communication device 210 and the second communication device 220 to establish the bi-directional link.

In some embodiments, the first communication device 210 includes a detector 212 to detect the optical signal sent by the first communication device 210. The controller 214 is configured to determine whether the detected optical signal is as expected. For example, the controller 214 can determine whether the detected optical signal has the expected power, wavelength, polarization, and/or phase. In response to unsatisfactory detected signal, the controller 214 can, for example, generate an alert signal to indicate possible error in the Ethernet connection 215.

In some embodiments, the optical signal transmitted by the second communication device 220 can be encoded with information about the desired or expected optical power. The controller 214 can then compare the actually detected optical power with this desired or expected optical power to determine the status of the connection 215. In some embodiments, the system 200 can also include a detector (not shown) at the second communication device 220 to measure the actual transmission power of the optical signal. This actual transmission power can also be transmitted to the first communication device 210 and compared with the actually received optical power to determine the status of the connection 215.

In some embodiments, the controller 214 can be disposed outside (and physically separate from) the first communication device 210 and in operative communication with both the first communication device 210 and the second communication device 220. The controller 214 can adjust the power of the optical signal based on the received power at the first communication device 210.

The controller 214 in the system 200 can include any suitable processor capable of executing computer instructions. Each module in the processor can be any one or combination of hardware-based module (e.g., a field-programmable gate array (FPGA), an application specific integrated circuit (ASIC), a digital signal processor (DSP) and/or software-based module (e.g., a module of computer code stored in memory and/or executed at the processor) configured to execute a specific function. The processor can be a microcontroller, a FPGA, an ASIC, or any other suitable processor configured to run and/or execute the modules. The processor and modules of the processor can be configured to collectively execute the methods described herein, and/or to implement the apparatuses described herein.

Although only one second communication device 220 is illustrated in FIG. 2, in practice, the system 200 can include any other number of second communication devices 220. For example, the system 200 can include multiple CPEs connected to the first communication device 210, and each CPE is configured to use a distinct wavelength to communicate with the first communication device 210 at a given time. To provision this wavelength, the first communication device 210 sends out an Ethernet signal containing the designated wavelength information to each CPE. The corresponding CPE, after receiving the Ethernet signal, then can communicate with the first communication device 210 using the designated wavelength. In some embodiments, the second communication devices 220 can reuse wavelengths in the WDM scheme, and methods described herein can be used for the reassignment of wavelengths as well.

With the capability of plug-and-play automation, the first communication device 210 and the second communication device 220 can be employed in various applications. In some deployments, the first communication device 210 can be employed in a business edge network. In these deployments, the first communication device 210 can include an edge router configured to support L2/L2.5/L3 VPN services which, in combination with multilayer, multiprotocol resiliency, ensure (or increase the likelihood) that customer service level agreement (SLAs) are met under all network conditions.

In some deployments, the first communication device 210 can be used as an internet/peering gateway. The first communication device 210 can include a router configured to support the high performance, reliability, scale, and density to efficiently peer with Internet and other service provider networks.

In some deployments, the first communication device 210 can be used as a broadband network gateway (BNG). In these deployments, the first communication device 210 can include a router configured to offer high subscriber density and sophisticated broadband edge features available in the industry.

In some deployments, the first communication device 210 can be used as a universal software defined network (SDN) gateway, where the first communication device 210 can be configured for interconnecting virtual and physical networks, as well as between virtual networks operating with different technologies. The interconnection can be realized via, for example, support for Multiprotocol Border Gateway Protocol (MBGP), dynamic tunnels using Multiprotocol Label Switching over generic routing encapsulation (MPLSoGRE) or Virtual Extensible LAN (VXLAN) encapsulation, virtual routing and forwarding (VRF) tables, E-VPNs, and/or Network Configuration Protocol (NETCONF), among others.

In some deployments, the first communication device 210 can be used within a data center and cloud edge network, in which the first communication device 210 can be configured to support multiple overlay encapsulation methods, including VXLAN, Network Virtualization using Generic Routing Encapsulation (NVGRE), Multiprotocol Label Switching over User Datagram Protocol (MPLSoUDP), MPLSoGRE, 802.1BR, segment routing-multiprotocol label switching (SR-MPLS), and segment routing-v6 (SR-V6).

In some deployments, the first communication device 210 can be used in an enterprise WAN. Enterprises and government agencies worldwide can use the first communication device 210 to build their own overlay network on top of a service provider's Layer 2 or MPLS network, using encapsulation technologies such as MPLSoGRE, VXLAN, and IPsec for secure transport.

In some deployments, the first communication device 210 can be used for universal metro/aggregation. In these embodiments, the first communication device 210 can be configured to provide a full suite of routing and switching features, allowing users to choose a deployment model that best fits business and technical considerations. The first communication device 210 can be deployed as IP/IP VPN edge routers, Ethernet VPN (EVPN) and virtual private LAN service (VPLS) provider edge (VPLS-PE) routers, MPLS label-switching (LSR) routers, and as Layer 2 Ethernet switches or Layer 3 IP routers.

In some deployments, the first communication device 210 can be used for mobile backhaul. In addition to switching, routing, and security features, the first communication device 210 can be further configured to support highly scalable and reliable hardware-based timing that meets the LTE requirements, including Synchronous Ethernet for frequency and the Precision Time Protocol (PTP) for frequency and phase synchronization.

To facilitate the operation of the first communication device 210 in various applications, the first communication device 210 can include one or more modular components. In some embodiments, the first communication device 210 can include Modular Port Concentrators (MPCs), which are configured to provide routing, Multiprotocol Label Switching (MPLS), switching, inline services, subscriber management, and hierarchical quality of service (HQoS), among others. The MPCs can also be configured to host interfaces directly or via Modular Interface Cards (MICs) that allow users to "mix and match" interface types. Powered by a programmable silicon chipset, the MPCs can collect and stream telemetry that identifies resource utilization, loss and delay, and other metrics.

In some implementations, the first communication device 210 can include Switch Control Boards (SCBs), which each includes an integrated switch fabric that connects to all slots in the chassis in a nonblocking architecture. The SCBs can be configured to house the Routing Engine, control power to MPCs, monitor and control system functions such as fan speed and the system front panel, and manage clocking, resets, and boots. The Routing Engine (RE) is usually configured to provide the control plane, runs operating systems, and handles all routing protocol processes as well as the software processes that control MPCs, chassis components, system management, and user access to the router.

The second communication device 220 can also be employed in various applications. In some deployments, the second communication device 220 in a metro Ethernet network. In one example, the metro Ethernet network can be used for business services, where the second communication device 220 can be deployed as a CPE or network interface device (NID) to provide Layer 2 or Layer 3 business access, direct Internet access, and IP services such as IP VPN. The second communication device 220 can be configured to provide robust Operation, Administration, and Maintenance (OAM) and service level agreement (SLA) control capabilities, together with automation and zero touch provisioning.

In another example, the metro Ethernet network can include residential aggregation, in which case the second communication device 220 can be employed as a versatile metro aggregation platform. The second communication device 220 can be configured to support high port densities and rich features such as Ethernet OAM for E-LINE, E-LAN, E-TREE over Ethernet or IP/Multiprotocol Label Switching (MPLS), and IP VPN.

In some deployments, the second communication device 220 can be used in wholesale mobile backhaul. In addition to Metro Ethernet Forum Carrier Ethernet (MEF-CE) 2.0 supporting both Ethernet and IP/MPLS, the second communication device 220 can be further configured to provide high capacity and scalability, complete timing and synchronization, and integrated security and SLA tools that wholesale operators can use to differentiate for mobile backhaul services. Additionally, the second communication device 220 can be used as a last-mile deployment solution for a small cell-as-a-service offering.

In some deployments, the second communication device 220 can be used for cloud exchange. In these deployments, the second communication device 220 can be configured to have high capacity, low power consumption, and rich MEF and IP feature set.

In some deployments, the second communication device 220 can be used for mobile backhaul and fronthaul. The accelerating speed of innovation is forcing mobile operators to start planning for migration to LTE-Advanced and 5G, which can place more stringent specifications for capacity, latency, synchronization, and security on the network infrastructure. The second communication device 220 can be equipped, for example, with 1 GbE/10 GbE interfaces and providing up to 60 Gbps of throughput. In addition to high capacity and density to address scaling requirements, the second communication device 220 can also address end-user quality requirements through high-precision timing, advanced security features, and enhanced SLA management capabilities.

In some deployments, the second communication device 220 can be configured to support all mobile services profiles including 2G/3G HSPA, 4G LTE, LTE-Advanced, and Small Cell. In a backhaul deployment scenario, the second communication device 220 can be used as a small cell router or macro cell site routers. The backhaul traffic carried over Ethernet or IP/MPLS can be aggregated by the second communication device 220 before it hits the mobile core. In a C-RAN deployment scenario, the second communication device 220 can be used for fronthaul in a battery backup unit (BBU) model.

In some deployments, the second communication device 220 can be used in an enterprise networking and field area network. Some existing networks are located in demanding and harsh environments, such as the field area networks for providing supervisory control and data acquisition (SCADA) system connectivity. Operators of these networks include power utilities, oil and gas, mining, rail and transportation, and defense and public safety industries. The second communication device 220 can be configured as small-form factor devices delivering comprehensive routing and security services, application awareness and control, with high availability to ensure business continuity and resiliency.

To facilitate the operation of the second communication device 220 in various applications, the second communication device 220 can include one or more of the following features. In some implementations, the second communication device 220 can include seamless MPLS. In some cases, a network can include up to tens of thousands of nodes, the seamless MPLS architecture enables scale and service flexibility by decoupling physical topology for transport and service layers. With a seamless MPLS architecture, service providers can leverage the existing investment of MPLS in the core and edge and extend the operational benefit into the access layer, enabling higher network service flexibility and higher scaling parameters of the MAN where metro Ethernet services can span across multiple network segments and be seamlessly terminated at any point of the network or cloud.

In some implementations, the second communication device 220 can include a management platform that provides comprehensive management with broad fault, configuration, accounting, performance, and security management (FCAPS) capabilities, for both device and service-level management. For device management, the management platform can be configured to support NETCONF, CLI, SNMP v1/v2/v3 protocols, and its APIs can support easy integration with existing network management systems (NMS) and operations/business support systems (OSS/BSS).

In some implementations, the second communication device 220 can include highly scalable and reliable hardware-based timing technology that meets the strictest LTE-A specifications for frequency and phase synchronization. Providing an accurate timing reference can be helpful for deployment of LTE radio access networks. In some embodiments, the second communication device 220 can be configured to support synchronous Ethernet for frequency as well as Precision Time Protocol (PTP) for both frequency and phase synchronization. In some embodiments, the second communication device 220 allows Synchronous Ethernet and PTP to be used in a hybrid mode for the highest level of frequency (e.g., 10 parts per billion or 10 ppb) and phase (e.g. less than 500 ns) accuracy used for LTE-A. In some embodiments, the second communication device 220 can also include an integrated global positioning system (GPS) receiver and can act as a grandmaster (GM) clock for a distributed PTP implementation, thereby facilitating the aggregation of small cell traffic when the backhaul is transported over the Internet.

In some implementations, the second communication device 220 can include advanced security services. For example, the second communication device 220 can implement advanced security services such as IPsec, MACsec, NAT, and TPM to protect against potential vulnerabilities to the network as well as subscriber traffic.

In some implementations, the second communication device 220 can include enhanced service assurance, SLA management, and Ethernet OAM. For example, the second communication device 220 can use 802.3ah, 802.1ag, Y.1731, Two-Way Active Measurement Protocol (TWAMP), and RFC2544.

In some implementations, the second communication device 220 can be temperature hardened and support passive cooling for outdoor deployments in extreme weather conditions. For example, the second communication device 220 can be based on environmentally hardened, ruggedized chassis and are IP65 compliant for outdoor deployments with no need for an enclosure or cabinet.

Figure 3:
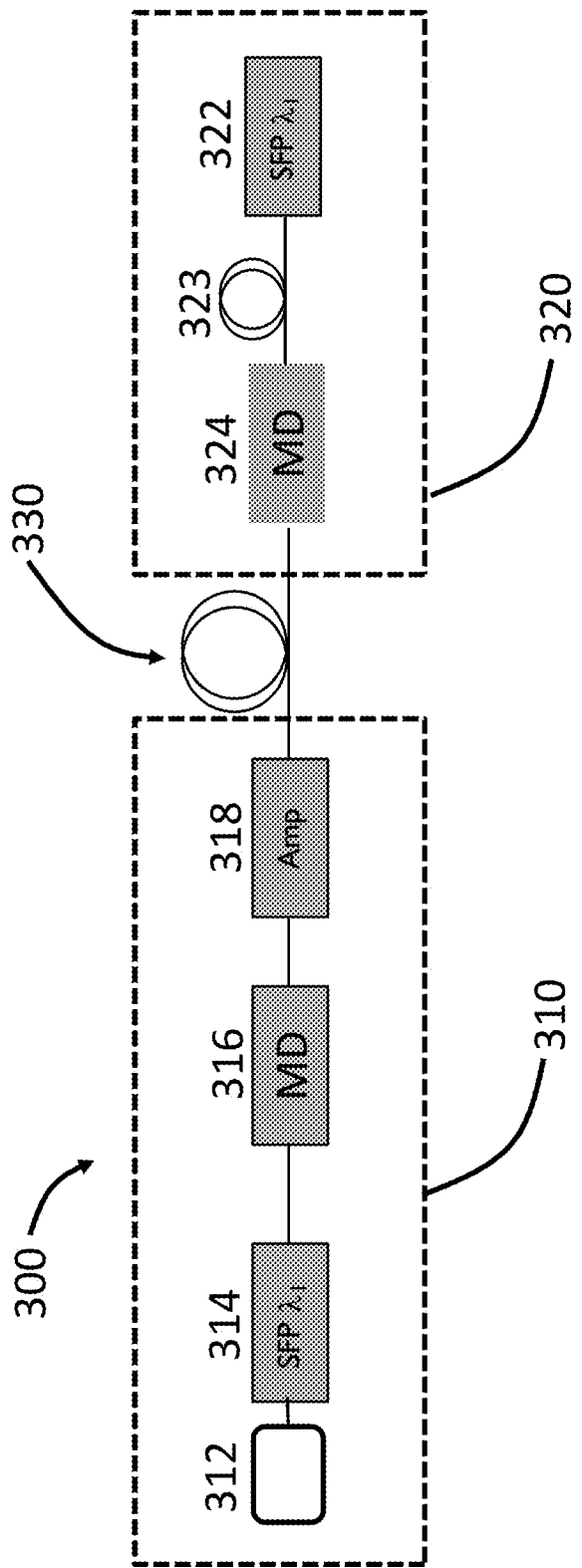
FIG. 3 shows a schematic of a system including a router with automatic wavelength provisioning capability, according to embodiments.

FIG. 3 shows a schematic of a system 300 including a router 312 and having automatic wavelength provisioning capability, according to embodiments. The system 300 includes a first end 310 (e.g., head end) and a second end 320 (e.g., tail end) connected by an Ethernet media 330 (e.g., optical fiber). The first end 310 includes the router 312 coupled to an SFP 314, a mux/demux 316, and an amplifier 318. The second end 320 includes a mux/demux 324 and an SFP 322 connected by a fiber 323. The SFP 322 can be connected to a CPE (not shown) or any other communication device described herein.

In operation, router 312 encodes into an Ethernet signal information about the designated wavelength to be used by the CPE on the second end 320 and then transmits the Ethernet signal to the second end 320 via the SFP 314. On the second end, the CPE receives the Ethernet signal and decodes the wavelength information from the Ethernet signal. Based on the decoded information, the CPE transmits an optical signal at the designated wavelength towards the router 312. Once the router 312 receives the optical signal and determines that the received optical signal is satisfactory (e.g., above a threshold optical power), a bi-directional link between the router 312 and the CPE can be established. Accordingly, the router 312 is configured to perform the automatic wavelength provisioning for the CPE on the other end of the system 300.

Figure 4:
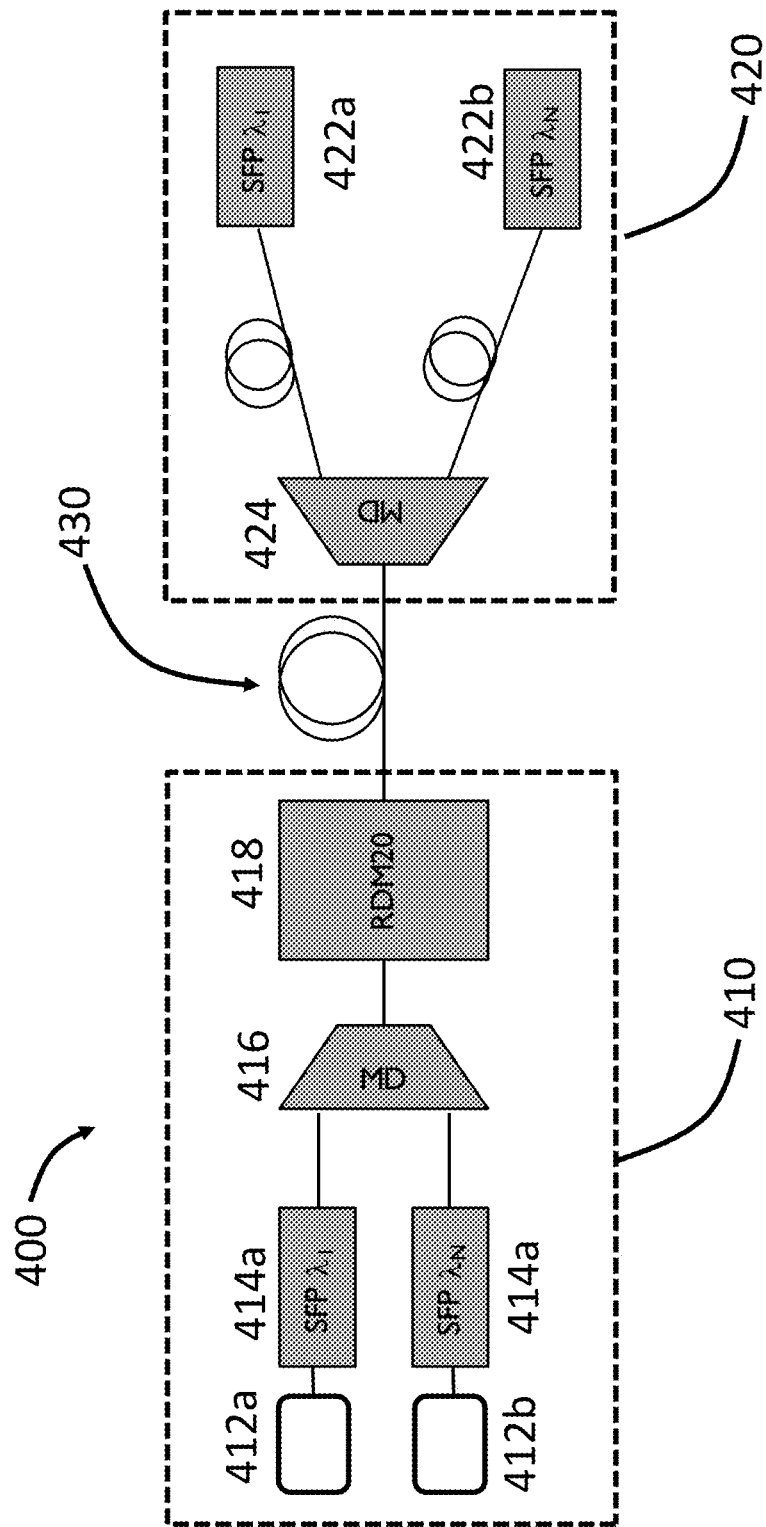
FIG. 4 shows a schematic of a WDM-PON having automatic wavelength provisioning capability, according to embodiments.

FIG. 4 shows a schematic of a WDM-PON 400 having automatic wavelength provisioning capability, according to embodiments. The network 400 includes a first end 410 and a second end 420 connected by Ethernet media 430. The first end 410 includes a first router 412a and a second router 412b, each of which is coupled to an SFP 414a and 414b, respectively. The first SFP 414a is configured to transmit signals at a first wavelength $\lambda_1$ and the second SFP 414b is configured to transmit signals at a second wavelength $\lambda_2$. A mux/demux 416 is employed to multiplex the optical signals from the two SFPs 414a and 414b and generate a multiplexed signal. The first end 410 also includes a ROADM 418 to connect the multiplexed signal to the Ethernet media 430.

On the second end 420, a mux/demux 424 is employed to demultiplex the multiplexed signal. The mux/demux 424 is also configured to direct the first signal at the first wavelength $\lambda_1$ toward a first user SFP 422a (coupled to a first CPE, not shown in FIG. 4) and the second signal at the second wavelength $\lambda_2$ toward a second user SFP 422b (coupled to a second CPE, not shown in FIG. 4). The communication on the reverse direction (i.e. from the second end 420 to the first end 410) can be substantially symmetric and details are not repeated.

In the network 400 before channel provisioning, the first router 412a can encode information of the first wavelength $\lambda_1$ into a first Ethernet signal and send the first Ethernet signal to the first CPE. The first CPE initially listens passively to the first Ethernet signal (i.e., shutting down or not activating the transmitter). In response to receiving the first Ethernet signal, the first CPE decodes the wavelength information and then turns on its transmitter to send an optical signal at the first wavelength $\lambda_1$ towards the first router 412a so as to establish a bi-directional link between the first router 412a and the first CPE.

Similarly, the second router 412b can encode information of the second wavelength $\lambda_2$ into a second Ethernet signal and send the second Ethernet signal to the second CPE. The second CPE initially listens passively to the second Ethernet signal. In response to receiving the second Ethernet signal, the second CPE decodes the wavelength information and then turns on its transmitter to send an optical signal at the second wavelength $\lambda_2$ towards the second router 412b so as to establish a bi-directional link between the second router 412b and the second CPE.

In some implementations, the ROADM 418 can be configured to balance the power of the transmitters (e.g., SFPs 422a and 422b) in the network 400. For example, the first user SFP 422a may be disposed closer to the first end 410 compared to the second user SFP 422b. In this case, the ROADM 418 can be configured to selectively amplify the signal directed toward the second user SFP 422b (and possibly attenuate the signal directed toward the first user SFP 422a) such that the two signals can have the same signal level when processed at the SFPs 414a and 414b, respectively.

Figure 5:
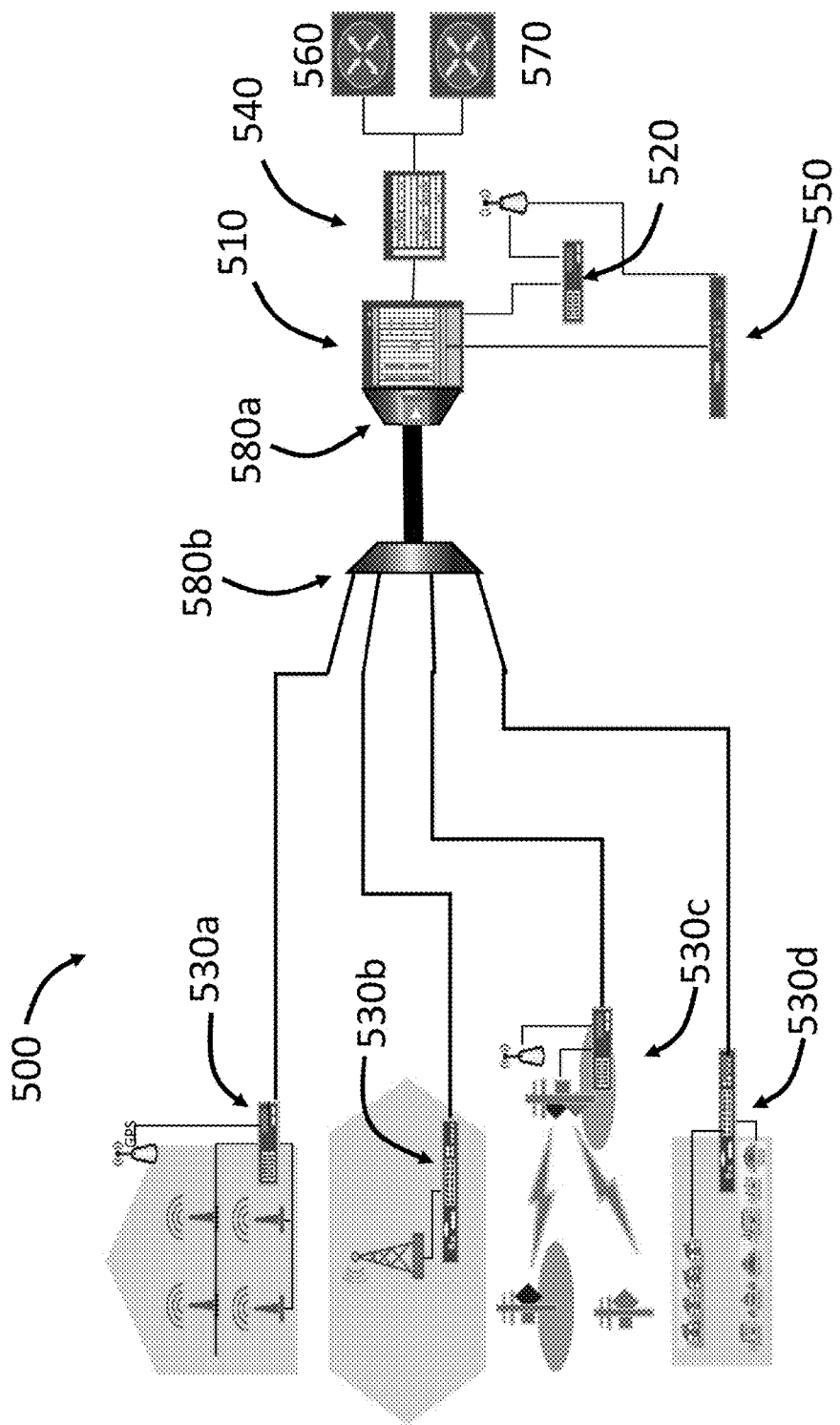
FIG. 5 shows a schematic of a mobile backhaul system with automatic wavelength provisioning capability, according to embodiments.

FIG. 5 shows a schematic of a mobile backhaul system 500 with automatic wavelength provisioning capability, according to embodiments. The system 500 includes an edge router 510 coupled to an array waveguide (AWG) 580a that directs multiplexed signals from the edge router 510 to a second AWG 580b. The second AWG 580b directs demultiplexed signals to CPEs 530a, 530b, 530c, and 530d, each of which operates at a distinct wavelength. The first CPE 530a is used for an indoor small cellular network. The second CPE 530b is used for a macro cellular network. The third CPE 530c is used for an outdoor small cellular network. The fourth CPE 530d is used for a residential and commercial network.

The edge router 510 is usually disposed at a POP location or central office location. Information about the wavelength used by each CPE 530a to 530d is encoded by the edge router 510 into Ethernet signals broadcast to the CPEs 530a to 530d. Each CPE can decode the corresponding Ethernet signal to determine (or identify) the wavelength designated for its use and can send back an optical signal at the designated wavelength so as to establish communication with the edge router 510. Once the communication is established, the edge router 510 can receive Ethernet frames from the CPEs 530*a* to 530*d*.

The network 500 can further include a router 520 to provide signals to the edge router 510, a mobility management entity (MME) 560, and a service gateway (S-GW) 570. A fire wall 540 (e.g., implemented by a router or a virtual firewall in a datacenter) can be disposed between the edge router 510 and the MME 560 and the S-GW 570. In addition, the system 500 can also include a timing server 550 to provide time stamping and redundant configurability.

Figure 6:
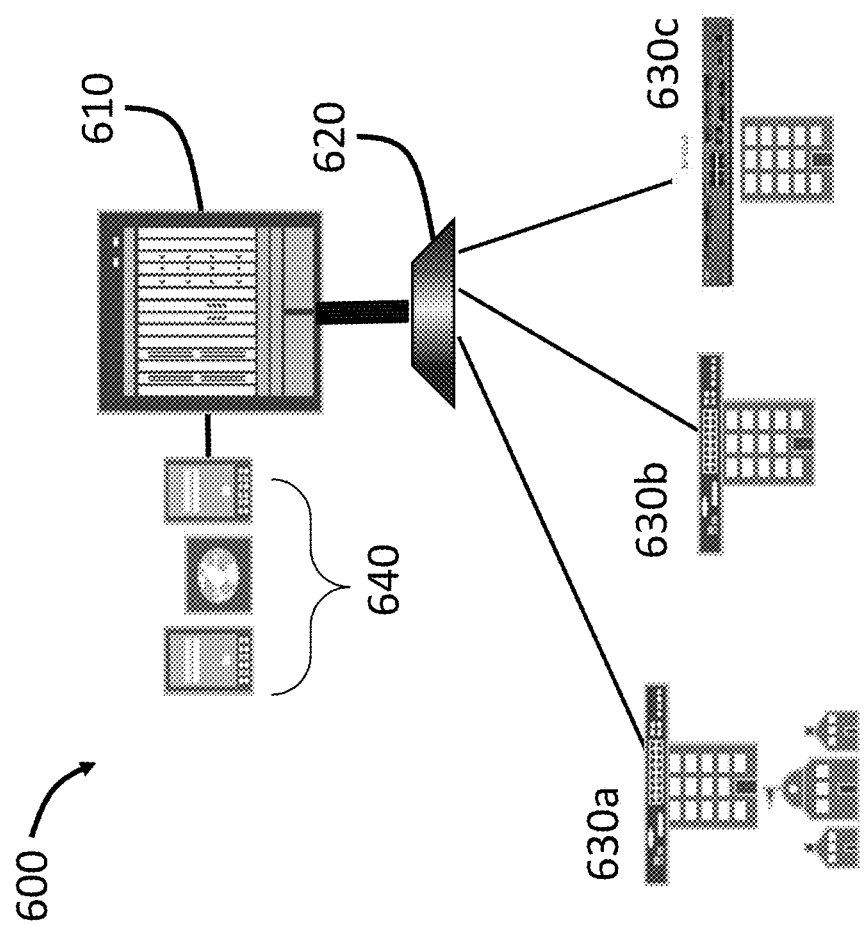
FIG. 6 shows a schematic of a fiber-to-the-building (FTTB) network with automatic wavelength provisioning capability, according to embodiments.

FIG. 6 shows a schematic of a fiber-to-the-building (FTTB) network 600 with automatic wavelength provisioning capability, according to embodiments. The network 600 includes a router 610 to deliver multiplexed signals to a switch 620, which directs demultiplexed signals to CPEs 630*a*, 630*b*, and 630*c* (collectively referred to as CPEs 630). In some implementations, the router 610 and the switch 620 can be directly connected together by optical fibers. In some implementations, various components, such as ROADMs and amplifiers, can be disposed between the router 610 and the switch 620 to construct the network 600.

The network 600 also includes a server system 640 (e.g., operated by a service provider) to provide content to the CPEs 630 and receive/store data from the CPEs 630. The first CPE 630*a* is used for a business service network. The second CPE 630*b* and the third CPE 630*c* are used for residential networks. In the system 600, IP starts from the access layer (i.e. payload is encapsulated into IP at the access layer). In addition, metro Ethernet service and residential access are provided from the same platform.

In operation, the router 610 encodes information about wavelengths to be used by the CPEs 630 into Ethernet signals, which are received and decoded by the CPEs 630 before they transmit back optical signals at the designated wavelengths for bi-directional communication with the router 610. For example, the first CPE 630*a* can decode the Ethernet signal including information about the first wavelength and then transmits back an optical signal at the first wavelength. Similarly, the second/third CPE 630*b/c* can decode the Ethernet signal including information about the second/third wavelength and then transmit back optical signals at the first/second wavelength.

In some embodiments, the Ethernet signals transmitted by the router 610 also includes device identification information. Therefore, when the first CPE 630*a* receives Ethernet signals for the second CPE 630*b* and/or the third CPE 630*c*, the first CPE 630*a* can discard the Ethernet signals based on the device identification information designating (or addressed to) another device.

Figure 7:
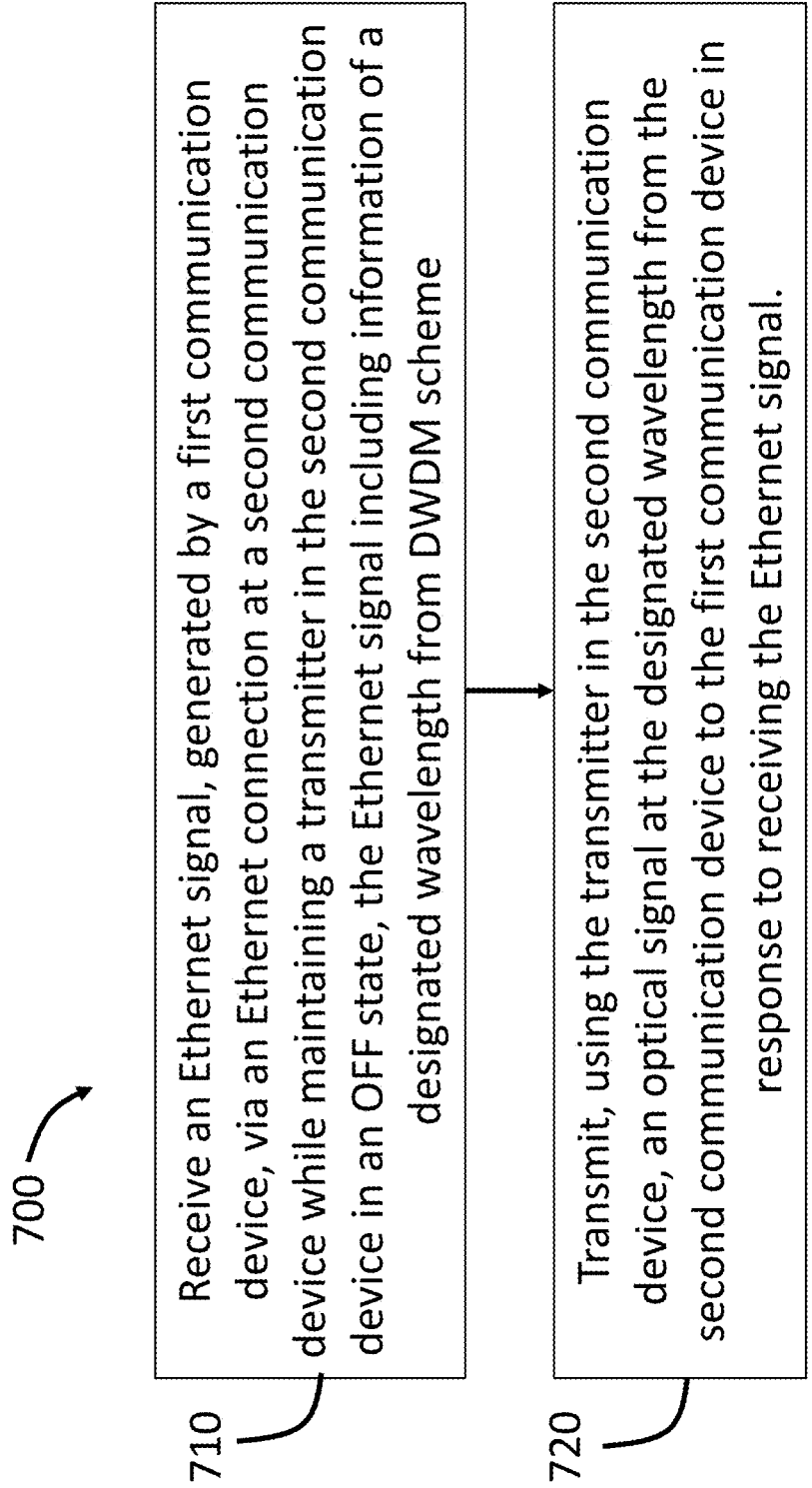
FIG. 7 illustrates a method of wavelength provisioning of a CPE, according to embodiments.

FIG. 7 illustrates a method 700 of automatic wavelength provisioning of a CPE, according to embodiments. The method 700 includes, at 710, receiving an Ethernet signal, generated by a first communication device in communication with a second communication device via an Ethernet connection, at the second communication device while maintaining a transmitter in the second communication device in an OFF state. The Ethernet signal is encoded with information of a designated wavelength, from a dense wavelength division multiplexing (DWDM) scheme, to be used by the second communication device. The method 700 also includes, at 720, transmitting an optical signal at the designated wavelength from the second communication device to the first communication device in response to receiving the Ethernet signal.

In some implementations, receiving the Ethernet signal includes receiving the Ethernet signal from a point of presence (POP) location by the second communication device located at a customer premise. In these implementations, the second communication device can include a CPE that is otherwise not easily accessible (e.g., due to physical remoteness). The method 700 can remotely provision the wavelength used by the second communication device and establish a bi-directional link between the first communication device and the second communication device.

In some implementations, receiving the Ethernet signal includes receiving the Ethernet signal from a router. In some implementations, receiving the Ethernet signal includes receiving the Ethernet signal from an edge router (e.g., used in an access network). In some implementations, the first communication device includes a first router, the second communication device includes a second router, and receiving the Ethernet signal includes receiving a link layer discovery protocol (LLDP) signal generated by the first router.

In some implementations, the method 700 further includes receiving the optical signal at the first communication device and establishing a bi-directional optical link between the first communication device and the second communication device in response to receiving the optical signal from the second communication device. In some implementations, the optical signal is encoded with desired or expected optical power in the optical signal, and the first communication device establishes the bi-directional link in the event that the actually received optical power matches the desired/expected optical power.

In some implementations, receiving the Ethernet signal includes receiving the Ethernet signal from a small formfactor pluggable (SFP) operatively coupled to the first communication device and configured to transmit the Ethernet signal.

In some implementations, the method 700 further includes receiving a second Ethernet signal, generated by the first communication device, at a third communication device while maintaining a second transmitter in the third communication device in the OFF state. The second Ethernet signal includes information of a second designated wavelength from the DWDM scheme to be used by the third communication device. The method 700 further includes transmitting, using the second transmitter in the third communication device, a second optical signal at the second designated wavelength from the third communication device to the first communication device in response to receiving the second Ethernet signal.

In some implementations, the method 700 further includes detecting a received power of the optical signal received by the first communication device and adjusting the transmitted power of the optical signal based on the received power at the first communication device. The method 700 can also include establishing a bi-directional link between the first communication device and the second communication device when the received power is above a threshold value. In some implementations, the first communication device includes a detector to measure the optical power. In some implementations, the detector can be an external detector disposed outside the first communication device.

While various embodiments have been described and illustrated herein, a variety of other means and/or structures for performing the function and/or obtaining the results and/or one or more of the advantages described herein, and each of such variations and/or modifications are possible. More generally, all parameters, dimensions, materials, and configurations described herein are meant to be examples and that the actual parameters, dimensions, materials, and/or configurations will depend upon the specific application or applications for which the disclosure is used. It is to be understood that the foregoing embodiments are presented by way of example only and that other embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

As used herein, a "module" can be, for example, any assembly and/or set of operatively-coupled electrical components associated with performing a specific function, and can include, for example, a memory, a processor, electrical traces, optical connectors, software (stored and executing in hardware) and/or the like.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
   receiving a first link layer discovery protocol (LLDP) signal, generated by an edge router disposed at a point of presence (POP) location and in communication with a first customer router and a second customer router via an Ethernet connection, at the first customer router while maintaining a first transmitter in the first customer router in an OFF state, each of the first customer router and the second customer router being disposed at a corresponding customer premise, the first LLDP signal including information of a first designated wavelength, from a dense wavelength division multiplexing (DWDM) scheme, to be used by the first customer router;
   transmitting, using the first transmitter in the first customer router, a first optical signal at the first designated wavelength from the first customer router to the edge router in response to receiving the first LLDP signal;
   receiving a second LLDP signal, generated by the edge router, at the second customer router while maintaining a second transmitter in the second customer router in the OFF state, the second LLDP signal including information of a second designated wavelength, from the DWDM scheme, to be used by the second customer router; and
   transmitting, using the second transmitter in the second customer router, a second optical signal at the second designated wavelength from the second customer router to the edge router in response to receiving the second LLDP signal.

2. The method of claim 1, further comprising:
   receiving the first optical signal at the edge router; and establishing a bi-directional optical link between the edge router and the first customer router in response to receiving the first optical signal from the first customer router.

3. The method of claim 1, wherein receiving the first LLDP signal includes receiving the first LLDP signal from a small form-factor pluggable (SFP) operatively coupled to the edge router and configured to transmit the LLDP signal.

4. The method of claim 1, further comprising:
   detecting a received power of the first optical signal received by the edge router;
   adjusting a transmitted power of the first optical signal based on the received power at the edge router; and
   establishing a bi-directional link between the edge router and the first customer router when the received power is above a threshold value.

5. A system, comprising:
   an edge router disposed at a point of presence (POP) location; and
   a plurality of customer routers in communication with the edge router via an Ethernet connection, each customer router in the plurality of customer routers being disposed at a corresponding customer premise,
   the edge router configured to transmit, via the Ethernet connection and toward a first customer router in the plurality of customer routers, a first link layer discovery protocol (LLDP) signal including information of a first designated wavelength from a dense wavelength division multiplexing (DWDM) scheme to be used by the first customer router,
   the first customer router configured to transmit a first optical signal to the edge router at the first designated wavelength in response to receiving the first LLDP signal,
   the edge router configured to transmit, via the Ethernet connection and toward a second customer router in the plurality of customer routers, a second LLDP signal including information of a second designated wavelength from the DWDM scheme, different from the first designated wavelength from the DWDM scheme, to be used by the second customer router, and
   the second router configured to transmit a second optical signal to the edge router at the second designated wavelength in response to receiving the second LLDP signal.

6. The system of claim 5, wherein the edge router is further configured to establish a bi-directional optical link with the first customer router in response to receiving the first optical signal from the first customer router.

7. The system of claim 5, wherein at least one of the first customer router or the second customer router includes a small form-factor pluggable (SFP).

8. The system of claim 5, wherein the edge router includes a detector to detect a received power of the first optical signal received by the edge router, the system further comprises:
   a controller, operatively coupled to the edge router and the first customer router, to adjust a transmitted power of the first optical signal based on the received power at the edge router.

* * * * *